United States Patent
Miyazaki et al.

[11] Patent Number: 6,075,299
[45] Date of Patent: Jun. 13, 2000

[54] MOTOR DRIVE SYSTEM

[75] Inventors: Masanori Miyazaki, Tokorozawa; Hirotaka Ono, Abiko; Masaru Yamamoto, Tokyo, all of Japan

[73] Assignees: Kabushiki Kaisha Toshiba; Toshiba Engineering Corp., both of Kawasaki, Japan

[21] Appl. No.: 09/247,807

[22] Filed: Feb. 11, 1999

[30] Foreign Application Priority Data

Feb. 12, 1998 [JP] Japan .................................. 10-029870

[51] Int. Cl.[7] ...................................................... H02K 7/10
[52] U.S. Cl. ............................................ 310/75 R; 174/51
[58] Field of Search ................................. 310/75 R, 71; 174/51

[56] References Cited

U.S. PATENT DOCUMENTS

| | | | |
|---|---|---|---|
| 3,952,218 | 4/1976 | Deters | 310/71 |
| 3,961,864 | 6/1976 | Papst et al. | 417/354 |
| 4,623,944 | 11/1986 | Yamashita | 360/84 |
| 4,808,865 | 2/1989 | King | 310/71 |
| 5,313,129 | 5/1994 | Stewart | 310/90 |
| 5,346,370 | 9/1994 | Krohn | 417/223 |
| 5,388,425 | 2/1995 | Bolton et al. | 62/262 |
| 5,596,237 | 1/1997 | Daniels | 310/71 |
| 5,646,370 | 7/1997 | Perkins | 174/51 |

*Primary Examiner*—Nestor Ramirez
*Assistant Examiner*—Joseph Wak
*Attorney, Agent, or Firm*—Foley & Lardner

[57] ABSTRACT

A motor drive system comprises a motor driven by a variable frequency power supply and a machine driven by the motor, which are mechanically connected by the drive shaft of the motor and the shaft of the machine via bearings. A stationary portion of the motor and the frame of the machine are electrically connected by a low-impedance conductor, so that a current can be caused to flow at least partially between the stationary portion of the motor and the frame of the machine.

8 Claims, 2 Drawing Sheets

MOTOR DRIVE SYSTEM

BACKGROUND OF THE INVENTION

The present invention relates to a motor drive system comprising a motor driven by a variable frequency power supply and a machine mechanically connected to and driven by the motor, and more particularly to a motor drive system which can effectively suppress, by a simple method, electric corrosion in the bearing portions of the drive shaft of the motor and the shaft of the driven machine.

Conventionally, a motor drive system of this type is arranged such that the drive shaft of the motor is directly connected to the rotation shaft of the driven machine. The motor is generally driven by a variable frequency power supply, in which the rotation can be easily controlled by means of an inverter. A voltage is supplied from the variable frequency power supply to a stator coil of the motor, so that the motor is driven.

The driven machine, such as a decelerator or a load machine, is mechanically coupled to the motor through the shafts of the driven machine and the motor. The shafts of the motor and the driven machine are supported by the frames thereof through the bearings.

The variable frequency power supply used as a power source of the motor obtains an AC driving voltage of 0 to 60 Hz from the direct current using a PWM (pulse width modulation) inverter or the like. In the aforementioned DC-AC conversion, a high-frequency voltage of 50 to 100 kHz is superposed on the AC driving voltage due to a steep change in voltage resulting from switching of the inverter circuit. When the AC driving voltage, on which the high-frequency voltage is superposed, is applied to the stator coil of the motor from the variable frequency power supply, a current, proportional to a ratio (dv/dt) of change in voltage supplied from the variable frequency power supply, flows through the frame of the motor via stray capacitance existing between the stator coil and the motor frame.

A pulse voltage or surge voltage superposed on the driving voltage fed from the variable frequency power supply flows as a current through the motor frame via the stray capacitance distributed between the stator coil and the motor frame. The current flows into an earth electrode (an electrode connected to an earth trunk line) via a motor earthing line connected to the motor frame. Then, the current is finally fed back to the variable frequency power supply via stray capacitance distributed between the variable frequency power supply and the earth electrode.

In this case, the current flowing through the stray capacitance between the stator coil and the frame is a resonant current produced by inductance of the stator coil, inductance between the variable frequency power supply and the stator coil, and the stray capacitance between the stator coil and the motor frame. In general, the frequency of the resonant current is as high as several tens of kHz to several MHz. The impedance between the motor frame and the earth electrode with respect to the high frequency current becomes high due to the skin effect of the conductor connecting the motor frame and the earth.

On the other hand, the frame of the driven machine is generally earthed to a base constituted by a steel frame of a building. The impedance between the frame of the driven machine and the earth electrode, in particular, the impedance with respect to a high frequency is low. Hence, the current flowing from the stator coil through the stray capacitance between the stator coil and the frame flows to the drive shaft of the motor via the bearings of the drive shaft. It further flows to the frame of the driven machine through the shaft of the driven machine connected to the drive shaft, and further to the earth electrode. Since the current flows through the bearings of the drive shaft of the motor and the bearings of the drive machine, it causes electric corrosion.

Conventionally, electric corrosion is prevented as follows. The motor frame and the drive shaft are short-circuited by an earth brush, so that the current flowing through the bearing of the drive shaft of the motor can be split.

In this method, however, the current flowing through the bearing of the drive shaft of the motor is reduced, whereas the current flowing through the bearings of the shaft of the driven machine is increased contrarily. For this reason, it is necessary to provide an earth brush between the shaft of the driven machine and the frame thereof. Further, since the earth brush is subject to wear, they must be exchanged periodically.

BRIEF SUMMARY OF THE INVENTION

An object of the present invention is to provide a motor drive system which can effectively suppress, by a simple method, electric corrosion in the bearing portions of the drive shaft of the motor and the shaft of the driven machine.

To achieve the above object, a motor drive system of the present invention comprises:

a motor driven by a variable frequency power supply, the motor having a motor drive shaft transmitting rotation of the motor and supported by a frame of the motor via first bearings;

a machine driven by the motor, the machine having a machine drive shaft mechanically coupled with the motor drive shaft and transmitting the rotation to the machine and supported by a frame of the machine via second bearings; and a conductor electrically connecting at least partially between a stationary portion of the motor and the frame of the machine.

It is preferable that both the frame of the motor and the frame of the machine is grounded.

It is preferable that the conductor is connected to the frame of the motor and the frame of the machine.

It is preferable that the conductor is anyone of a braided wire and a low inductance cable.

The conductor may be connected to a stator of the motor and the frame of the machine, and it is preferable that the conductor is anyone of a braided wire and a low inductance cable.

It is preferable that the conductor is a mount base made of metal electrically connecting the motor and the machine, on which the frames of the motor and the machine are mounted.

The motor drive system of the present invention comprises a motor driven by a variable frequency power supply and a machine driven by the motor, which are mechanically connected by the drive shaft of the motor and the shaft of the machine via bearings. A stationary portion of the motor and the frame of the machine are electrically connected by a low-impedance conductor, so that a current can be caused to flow at least partially between the stationary portion of the motor and the frame of the machine.

In this case, at least parts of the motor and the driven machine may be mounted on a mount base made of metal, so that a ground return current can flow through at least part of the region between the stationary portion of the motor and the frame of the driven machine.

In the motor drive system of the present invention, the stationary portion of the motor and the frame of the driven machine are electrically connected by a low-impedance conductor. Therefore, the current, flowing from the stator coil through the motor frame, the motor shaft bearings, the driven machine shaft bearings by a voltage rapidly risen due to switching of the variable frequency power source, is efficiently bypassed. As a result, since the current flowing through the bearing portions effectively is reduced, the electric corrosion in the bearing portions can be suppressed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described with reference to the accompanying drawings.

(First Embodiment)

Figure 1:
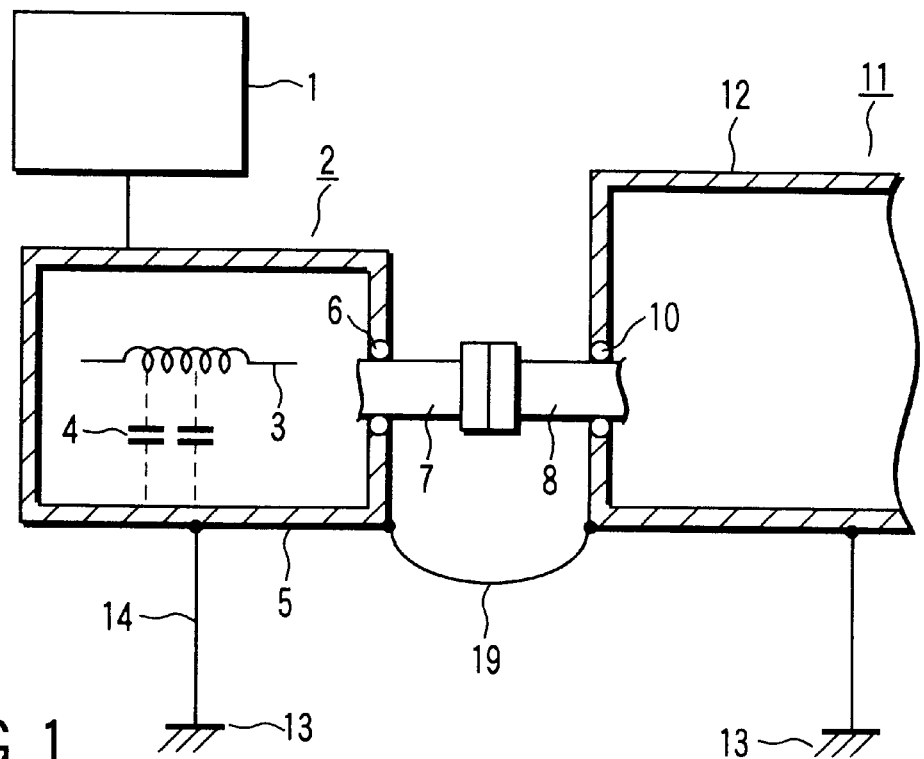
FIG. 1 is a schematic cross-sectional view of a motor drive system according to a first embodiment of the present invention.

FIG. 1 is a schematic cross-sectional view of a motor drive system according to a first embodiment of the present invention. Referring to FIG. 1, a voltage supplied from a variable frequency power supply 1 is fed to a stator coil 3 of a motor 2, thereby driving the motor 2.

The motor 2 is mechanically coupled to a driven machine 11, such as a decelerator or a load machine, by a motor shaft 7 and a driven machine shaft 8 connected to each other. The motor shaft 7 and the driven machine shaft 8 are supported by motor shaft bearings 6 and driven machine shaft bearings 10, respectively.

In the motor drive system having the above structure, when a rapidly-risen voltage generated by switching of a PWM inverter or the like is applied to the stator coil 3 of the motor, a current, proportional to a ratio (dv/dt) of change in voltage supplied from the variable frequency power supply 1, flows through a motor frame 5 via stray capacitance 4 existing between the stator coil 3 and the motor frame 5.

In this embodiment, as shown in FIG. 1, a stationary portion (the motor frame 5 having the same potential as that of the stator of the motor 2) of the motor 2 and a driven machine frame 12 are electrically connected at least partially through a low impedance conductor 19. Owing to this structure, a current (ground return) is caused to flow between the motor frame 5 and the driven machine frame 12, which generally has a lower ground resistance than that of the motor.

Figure 2:
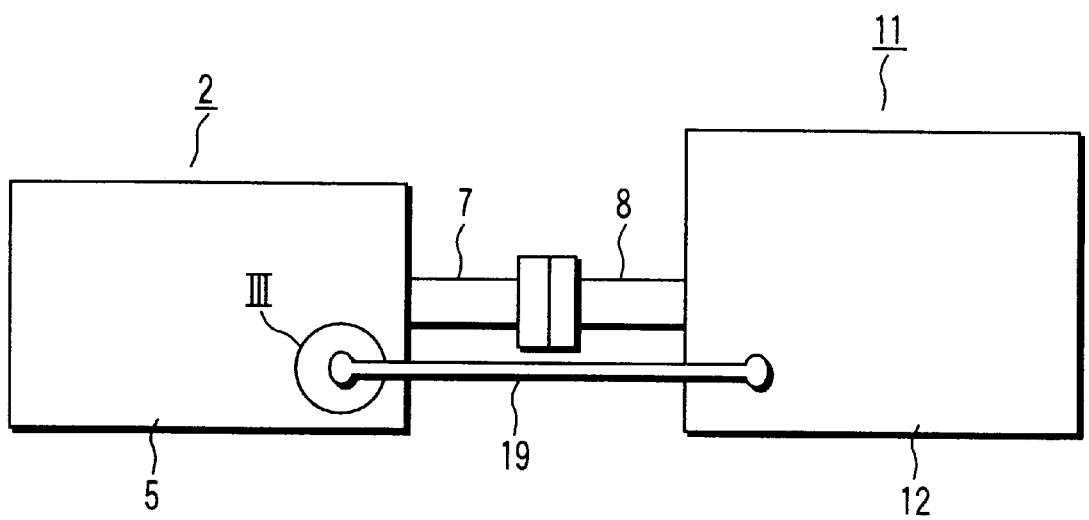
FIG. 2 is a schematic side view showing a specific way of connecting a conductor according to the first embodiment.
Figure 3:
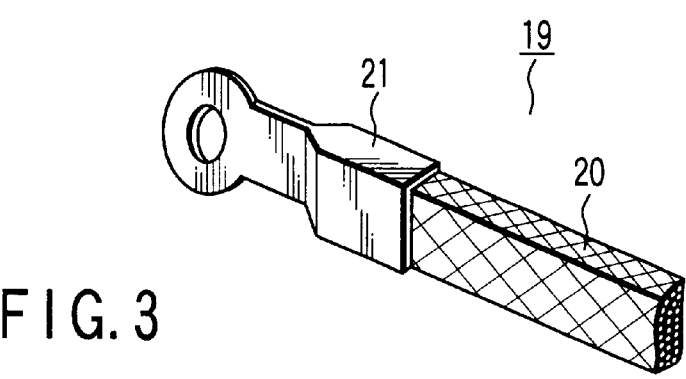
FIG. 3 is a partially cutaway perspective view of the conductor 19 shown in FIG. 2.

In this case, it is preferable that the conductor 19 electrically connecting the motor frame 5 and the driven machine frame 12 is made of, for example, a metal piece or a wire (cable) having a low high-frequency resistance. FIG. 2 shows an example in which a conductor 19 having a braided wire connects the earth terminal of the motor frame 5 and the earth terminal of the driven machine frame 12. FIG. 3 is an enlarged view showing a portion III of the conductor 19 shown in FIG. 2. The braided wire 20 is connected to the earth terminal (not shown) of the motor frame through a crimp-style terminal 21. Since the braided wire is made of a number of braided conductor wires, a high-frequency current flows through a surface portion of the conductor wires. Therefore, the surface resistance can be reduced effectively.

An operation of the motor drive system of this embodiment will now be described. Referring to FIG. 1, the motor frame 5 and the driven machine frame 12 are electrically connected by the conductor 19 as described above. Most of the current flowing from the stator coil 3 to the motor frame 5, by a voltage rapidly risen due to switching of the variable frequency power source 1, is allowed to flow out through the conductor 19 to the driven machine frame and further to an earth electrode 13. More specifically, the current, which flows from the motor frame 5 to the driven machine frame 12 through the motor shaft bearings 6, the motor shaft 7, the driven machine shaft 8 and the driven machine shaft bearings 10, is efficiently bypassed by the conductor 19, thereby effectively reducing the current flowing through the bearing portions. As a result, the electric corrosion in the bearing portions can be suppressed.

Figure 4:
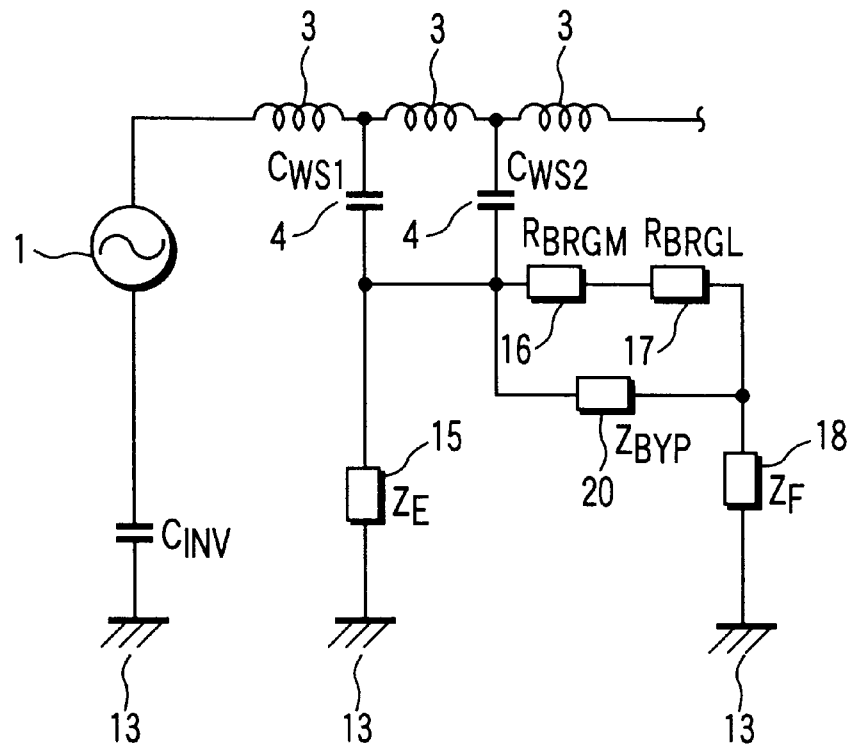
FIG. 4 is an equivalent circuit diagram for electrically explaining the motor drive system of the first embodiment.

The above matter will be more detailed with reference to the electrical equivalent circuit diagram of FIG. 4. Part of the current flowing out to the stray capacitance 4 between the stator coil and the frame is caused to flow to the earth electrode 13 through a motor shaft bearing equivalent resistance 16 and a driven machine shaft bearing resistance 17.

The conductor 19 of the motor drive system of this embodiment is connected electrically parallel with a circuit comprised of the motor shaft bearing equivalent resistance 16 and the driven machine shaft bearing resistance 17. Therefore, if the value of impedance ($Z_{BYP}$) of the conductor 19 is sufficiently lower than the resistance value of the serial circuit of the motor shaft bearing equivalent resistance 16 ($R_{BRGM}$) and the driven machine shaft bearing resistance 17 ($R_{BRGL}$), most of the current which should have flown from the motor shaft bearings through the motor shaft 7, the driven machine shaft 8 and the driven machine shaft bearings 10 is caused to flow through the conductor 19. Therefore, the current flowing through the bearing portions is reduced, thereby suppressing electric corrosion.

As described above, in the motor drive system of the first embodiment, since the motor frame 5 and the driven machine frame 12 are connected by the conductor 19, such as a metal piece or a cable, having low impedance with respect to a high frequency, the current flowing through the bearing portions is effectively bypassed. For this reason, electric corrosion in the bearing portions of the motor shaft 7 and the driven machine shaft 8 can be suppressed.

Moreover, to suppress electric corrosion in the bearing portions of the motor shaft 7 and the driven machine shaft 8, it is unnecessary to provide earth brushes between the motor frame 5 and the motor shaft 7 and between the driven machine shaft 8 and the driven machine frame 12. Further, no periodic maintenance of earth brushes is required.

(Second Embodiment)

Figure 5:
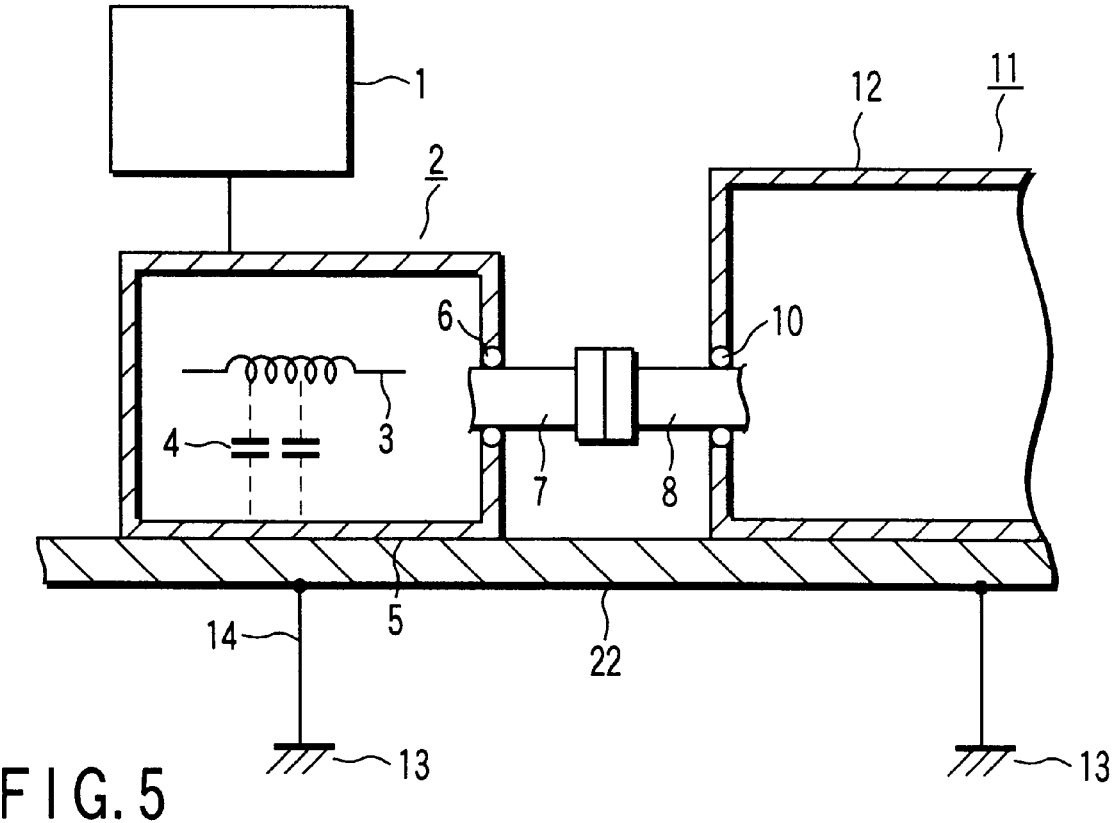
FIG. 5 is a schematic cross-sectional view of a motor drive system according to a second embodiment of the present invention.

In the first embodiment, the stationary portion of the motor (the motor frame 5) and the frame 12 of the driven machine 11 are connected by a metal piece or a wire (cable), i.e., a low inductance conductor (cable). According to a second embodiment, as shown in FIG. 5, at least parts of the motor 2 and the driven machine 11 are mounted on a mount base 22 made of metal. In this case, it is necessary that the impedance between the motor frame 5 and the base 22 and the impedance between the driven machine 11 and the base 22 be sufficiently lower than the impedance of a current path formed through the bearings 6, the motor shaft 7, the driven machine shaft 8 and the bearings 10.

With the above structure, the motor drive system of the second embodiment can provide the same effect and advantage as those of the first embodiment.

(Third Embodiment)

The first and second embodiments may be combined to constitute a third embodiment. More specifically, it is possible that the motor frame 5 and the driven machine frame 12 are connected by a metal piece or a wire (cable) and at least parts of the motor 2 and the driven machine 11 are mounted on a mount base 22 made of metal. Although the third embodiment is not shown in the drawings, it is obtained by adding the conductor 19 shown in FIG. 1 to the structure shown in FIG. 5.

With the motor drive system of the third embodiment, the same effect and advantage as those of the first embodiment can be obtained more effectively.

In the first to third embodiments, the conductor 19 or 22 is connected to the motor frame 5 having the same potential as that of the stator of the motor 2. However, the present invention is not limited to these embodiments: the conductor 19 may be connected directly to the stator of the motor 2. If the stator is made of laminated silicon steel plates fastened by a fastener bolt or the like, an end portion of the conductor 19 may be connected to the bolt.

As described above, according to the present invention, the stationary portion of the motor and the driven machine frame are electrically connected by a conductor of a low impedance, so that a current can flow through at least a part of the region between the stationary portion of the motor and the driven machine frame. Thus, electric corrosion in the bearing portions of the motor shaft and the driven machine shaft can be effectively suppressed by a simple method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A motor drive system comprising:

a motor driven by a variable frequency power supply, the motor having a motor drive shaft transmitting rotation of the motor and supported by a frame of the motor via first bearings, the frame of the motor being grounded;

a machine driven by the motor, the machine having a machine drive shaft mechanically coupled with the motor drive shaft and transmitting the rotation to the machine and supported by a frame of the machine via second bearings, the frame of the machine being spaced apart from the frame of the motor and the frame of the machine being grounded; and a conductor electrically connecting at least partially between a stationary portion of the motor and the frame of the machine.

2. The motor drive system according to claim 1, wherein the conductor is connected to the frame of the motor and the frame of the machine.

3. The motor drive system according to claim 2, wherein the conductor is one of a braided wire and a low inductance cable.

4. The motor drive system according to claim 3, wherein the conductor has a resistance lower than an electric resistance between the motor drive shaft and the machine drive shaft.

5. The motor drive system according to claim 1, wherein the conductor is connected to a stator of the motor and the frame of the machine.

6. The motor drive system according to claim 5, wherein the conductor is one of a braided wire and a low inductance cable.

7. The motor drive system according to claim 1, wherein the conductor is a mount base made of metal electrically connecting the motor and the machine, on which the frame of the motor and the frame of the machine are mounted.

8. The motor drive system according to claim 7, wherein the conductor further includes one of a braided wire and a low inductance cable that electrically connects the frame of the motor and the frame of the machine at a location different from a bottom surface of the frame of the machine and a bottom surface of the frame of the motor through which the mount base made of metal provides an electrical connection.

* * * * *